(12) United States Patent
Bachmann (10) Patent No.: US 12,031,624 B2
(45) Date of Patent: Jul. 9, 2024

(54) ELECTROMECHANICAL POWER STEERING HAVING A HELICAL-GEAR TRANSMISSION AND A TRANSMISSION HOUSING

(71) Applicants: thyssenkrupp Presta AG, Eschen (LI); thyssenkrupp AG, Essen (DE)

(72) Inventor: Andreas Bachmann, Langenargen (DE)

(73) Assignees: thyssenkrupp Presta AG, Eschen (LI); thyssenkrupp. AG, Essen (DE)

( * ) Notice: Subject to any disclaimer, the term of this patent is extended or adjusted under 35 U.S.C. 154(b) by 756 days.

(21) Appl. No.: 15/733,993

(22) PCT Filed: Jun. 7, 2019

(86) PCT No.: PCT/EP2019/065012
§ 371 (c)(1),
(2) Date: Dec. 1, 2020

(87) PCT Pub. No.: WO2019/238576
PCT Pub. Date: Dec. 19, 2019

(65) Prior Publication Data
US 2021/0088126 A1    Mar. 25, 2021

(30) Foreign Application Priority Data

Jun. 14, 2018  (DE) ...................... 10 2018 114 267.6

(51) Int. Cl.
*F16H 57/12*    (2006.01)
*B62D 5/04*     (2006.01)
(Continued)

(52) U.S. Cl.
CPC ........... *F16H 57/12* (2013.01); *B62D 5/0454* (2013.01); *F16H 1/16* (2013.01); *F16H 57/022* (2013.01);
(Continued)

(58) Field of Classification Search
CPC ...... F16H 57/12; F16H 57/022; F16H 57/031; F16H 57/039; F16H 1/16; F16H 2057/127; B62D 5/0454
See application file for complete search history.

(56) References Cited

U.S. PATENT DOCUMENTS 6,763,738 B1 *  7/2004  Tsutsui ................. B62D 5/0409
                                                74/425
7,882,759 B2 *  2/2011  Schwendemann ..... H02K 7/081
                                                74/425
(Continued)

FOREIGN PATENT DOCUMENTS

CN    104176113 A    12/2014
DE    27 50 477 A    5/1979
(Continued)

OTHER PUBLICATIONS

English Translation of International Search Report issued in PCT/EP2019/065012, dated Jul. 15, 2019.

*Primary Examiner* — Tony H Winner
(74) *Attorney, Agent, or Firm* — thyssenkrupp North America, LLC (57) ABSTRACT

A helical-gear transmission for an electromechanical power steering includes a shaft intermeshing with a helical gear. The shaft is arranged in a transmission housing and is rotatably mounted in the transmission housing about a longitudinal axis, having the first end thereof in a drive-side bearing arrangement and the second end thereof in a non-drive-side bearing arrangement. The transmission housing has, in extension of the shaft on a non-drive-side end, an opening which can be sealed by a cover, wherein the cover has a cover base and a surrounding cover edge, wherein the cover base has, in the region of the shaft, a bulge extending to the outside in the direction of the shaft which forms an axial lock of the shaft.

14 Claims, 4 Drawing Sheets

(51) Int. Cl.
*F16H 1/16* (2006.01)
*F16H 57/022* (2012.01)
*F16H 57/031* (2012.01)
*F16H 57/039* (2012.01)

(52) U.S. Cl.
CPC ......... *F16H 57/031* (2013.01); *F16H 57/039* (2013.01); *F16H 2057/127* (2013.01)

(56) References Cited

U.S. PATENT DOCUMENTS

| | | | |
|---|---|---|---|
| 9,835,240 | B2 | 12/2017 | Chauvrat |
| 9,902,421 | B2* | 2/2018 | Kawamura ................ F16H 1/16 |
| 10,183,693 | B2* | 1/2019 | Segawa .................... F16H 57/12 |
| 10,288,126 | B2* | 5/2019 | Segawa .................... B62D 5/04 |
| 10,883,594 | B2* | 1/2021 | Ueda .................. F16H 57/0498 |
| 2004/0149512 | A1* | 8/2004 | Tsutsui ................ B62D 5/0409 |
| | | | 180/443 |
| 2011/0127867 | A1 | 6/2011 | Oh |
| 2015/0308558 | A1 | 10/2015 | Monnet |
| 2017/0197653 | A1 | 7/2017 | Park |
| 2018/0015943 | A1 | 1/2018 | Hegedüs |
| 2018/0257697 | A1* | 9/2018 | Son ......................... F16H 57/12 |
| 2019/0234505 | A1* | 8/2019 | Ishii .................... F16H 57/0498 |
| 2019/0337554 | A1 | 11/2019 | Park |

FOREIGN PATENT DOCUMENTS

| | | |
|---|---|---|
| DE | 34 23 315 A | 1/1986 |
| DE | 600 17 982 T | 2/2006 |
| DE | 10 2008 032278 A1 | 2/2009 |
| DE | 10 2008 043 792 A | 5/2010 |
| DE | 10 2012 111 923 A | 6/2014 |
| DE | 10 2013 022 159 B | 12/2014 |
| DE | 10 2014 225 992 A | 6/2016 |
| DE | 10 2015 201 938 A | 8/2016 |
| DE | 10 2016 006 156 A | 11/2017 |
| EP | 2 740 874 A | 6/2014 |
| EP | 3 135 559 A | 3/2017 |
| GB | 2 046 866 A | 11/1980 |
| WO | 2018/069423 A | 4/2018 |
| WO | 2018/124441 A | 7/2018 |

* cited by examiner

ELECTROMECHANICAL POWER STEERING HAVING A HELICAL-GEAR TRANSMISSION AND A TRANSMISSION HOUSING

CROSS REFERENCE TO RELATED APPLICATIONS

This application is a U.S. National Stage Entry of International Patent Application Serial Number PCT/EP2019/065012, filed Jun. 7, 2019, which claims priority to German Patent Application No. DE 10 2018 114 267.6, filed Jun. 14, 2018, the entire contents of both of which are incorporated herein by reference.

FIELD

The present disclosure generally relates to a helical-gear transmission.

BACKGROUND

A generic helical-gear transmission, for example for an electromechanical power steering, has an electrical servo motor which drives a worm shaft which intermeshes with a worm wheel arranged on a steering shaft or directly on a steering pinion which is in engagement with a rack. The worm shaft is coupled to a motor shaft of the electric motor. The worm wheel is connected fixedly in terms of rotation to the steering shaft or to the steering pinion. The worm shaft of a conventional worm gear has a fixed bearing at the drive-side end and a floating bearing at its free end. The worm shaft is acted upon radially by a pretensioning force and pressed against the worm wheel teeth. The pretensioning force in this case is provided by a spring and a pressure device which are conventionally arranged at the free end.

The worm gear housing is closed at its end remote from the motor by a cover for protecting against the penetration of dirt and for the axial lock of the worm shaft and/or the floating bearing. A worm gear arrangement is disclosed in the published patent application EP 3 135 559 A1, in which the housing is closed by a cover. Moreover, US 2015/0308558 A1 discloses a worm gear in which a restoring spring of a pressure device has retaining mandrels which are operatively connected to a guide wall of a plug. The plug in this case is fixed via a snap connection to the housing of the transmission.

Thus a need exists to provide an electromechanical power steering having a worm gear in which the worm gear housing is protected against the penetration of dirt by means of an improved cover, wherein the cover is further designed to lock axially the worm shaft and/or a bearing arrangement in a manner which is simpler, with less noise and with a small number of components.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a helical-gear transmission and an electromechanical power steering comprising such a helical-gear transmission.

Accordingly, a helical-gear transmission comprising a shaft intermeshing with a helical gear is provided, wherein the shaft is arranged in a transmission housing and is rotatably mounted in the transmission housing about a longitudinal axis, having the first end thereof in a first bearing arrangement and the second end thereof in a second bearing arrangement, wherein the transmission housing has, in the extension of the shaft on a non-drive-side end, an opening which can be sealed by a cover, wherein the cover has a cover base and a surrounding cover edge and wherein the cover base has, in the region of the shaft, a bulge extending to the outside in the direction of the shaft, which forms an axial lock of the shaft. Preferably, the first bearing arrangement is configured as a drive-side bearing arrangement and the second bearing arrangement is configured as a non-drive-side bearing arrangement.

Preferably, the cover according to the invention is a component of an electromechanical power steering.

The axial lock of the shaft, therefore, is provided without additional components or further process steps. There are no further components in the axial direction between the shaft and the cover and/or between the non-drive-side bearing and the cover, so that in the case of the failure of the worm bearing the worm shaft lies directly against the outer face of the cover and/or the cover base without additional suspension. The cover may be incorporated at any time into an already existing production run, since no other parts have to be adapted. The use of the axial lock (failure of the worm bearing) is additionally made noticeable by a loud noise development when the shaft strikes against the cover, without failure.

Preferably, the cover is pressed into the opening. In a preferred embodiment the bulge is shaped cylindrically with a circular bottom surface. In this case, it is advantageous if the bulge has an external diameter which is at least as large as the diameter of the shaft. Further preferably, the external diameter of the bulge is at least as large as the external diameter of an internal ring of a bearing of the non-drive-side bearing arrangement. Preferably, an axis of symmetry of the bulge corresponds to the longitudinal axis of the shaft.

In a preferred embodiment, the cover edge has a serrated edge which is pretensioned outwardly in the radial direction of the longitudinal axis and in the pressed-in state lies against an inner face of the transmission housing and forms an ejection resistance. The ejection resistance in the axial direction is thus solely produced by the edge of the cover. Preferably, the serrated edge is fixed over the periphery by pretensioning. The serrations may be teeth which are distributed uniformly over the periphery and which extend substantially in the longitudinal direction. By means of the teeth configured over the periphery, no additional fastening elements, such as for example screws, are required. Moreover it is conceivable and possible that the edge contour of the cover edge is configured as fluting, as a ribbed contour or as knurling. Preferably, the serrated edge produces a non-positive connection of the cover with the transmission housing.

Preferably, all of the serrations or teeth of the serrated edge have an identical serration length, serration width and serration height. The ratio between the serration width and the serration length in this case may be configured such that 0 is less than the serration length and less than three times the serration width. Moreover, the ratio to one another may be that ⅛ is less than the serration width and less than the serration length. It is also conceivable and possible that at least one tooth or serration has a serration length, serration width and/or serration height which differs from the other serrations.

In an advantageous embodiment, the cover edge has a tab which has an outwardly angled-back region, wherein in the installed state of the cover the lower face of the angled-back region of the tab lies against the front face of the housing in the region of the opening. The tab serves, therefore, as a mounting and dismantling aid.

Preferably, the second bearing arrangement has a pretensioning device, the position of the shaft being adjustable thereby relative to the helical gear, wherein the pretensioning device has a spring-pretensioned pin which defines a pivot axis and wherein the cover base has an inwardly oriented indentation which forms a free space for the pin. An inwardly oriented indentation preferably extends in a direction from the shaft and opposing the outwardly extending bulge. The indentation is preferably configured parallel to the bulge and the longitudinal axis. The functionality of the pretensioning device is thus not limited by the cover.

It may further be provided that the cover base has an inwardly oriented projection which in the installed state lies on the outer face against the transmission housing and forms a mounting stop. Preferably, the inwardly oriented projection corresponding to the inwardly oriented bulge faces in the direction from the shaft and opposing the outwardly extending bulge.

In the event that a tab and a projection are provided, it is advantageous if the tab and the projection are arranged on opposing sides of the bulge. Thus it may be prevented that the cover cants and/or tilts when inserted.

Preferably, the cover edge has a first edge region which extends without interruption along the periphery of the cover base and a second edge region which adjoins the first edge region on a side remote from the base, wherein the second edge region forms the serrated edge which extends substantially in the direction of the longitudinal axis. The first continuous edge region serves for the stability of the cover.

It is generally preferred if the transmission housing is formed from a softer material than the cover. In the event of the cover being ejected, the serrated edge is able to erode the housing, whereby an ejection resistance is provided. Preferably, the transmission housing is formed as a cast housing made of aluminum and the cover is produced from spring steel.

In all of the embodiments it is preferred if the helical gear is a worm wheel and the shaft is a worm shaft.

Further provided is an electromechanical power steering comprising an electric motor having a motor shaft and an aforementioned helical-gear transmission, wherein the motor shaft drives the shaft of the helical-gear transmission. Preferably, in this case the helical gear is arranged fixedly in terms of rotation on a steering shaft of a motor vehicle.

Figure 1:
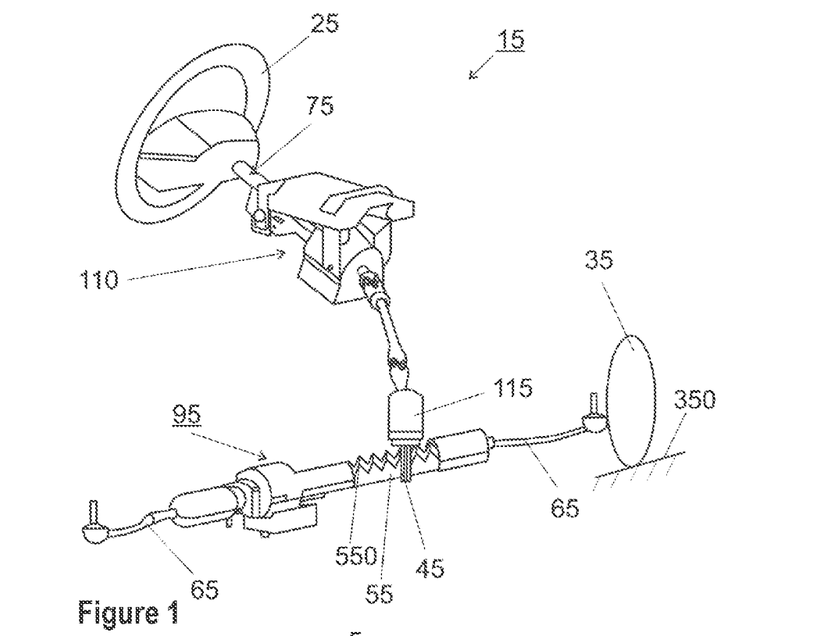
FIG. 1 is a schematic view of an electromechanical power assisted steering system.

An electromechanical motor vehicle power steering system 15 with a steering wheel 25 which is coupled fixedly in terms of rotation to a steering shaft 35, is shown schematically in FIG. 1. Via the steering wheel 25 the driver introduces a corresponding torque as a steering command into the steering shaft 35. The torque is then transmitted via the steering shaft 75 to a steering pinion 45. The pinion 45 intermeshes in the known manner with a toothed segment 550 of a rack 55. The steering pinion 45 forms together with the rack 55 a steering gear. The rack 55 is displaceably mounted in a steering housing in the direction of its longitudinal axis. At its free end the rack 55 is connected to track rods 65 via ball joints, not shown. The track rods 65 in turn are connected in the known manner via steering knuckles to one respective steered wheel 35 of the motor vehicle. A rotation of the steering wheel 25 leads, via the connection of the steering shaft 3 and the pinion 4, to a longitudinal displacement of the rack 55 and thus to a pivoting of the steered wheels 35. Via a road 350 the steered wheels 35 experience a reaction which counteracts the steering movement. A force is therefore needed to pivot the wheels 35, which requires a corresponding torque on the steering wheel 25. An electric motor 5 with a rotor position sensor (RPS) of a servo unit 110 is provided in order to assist the driver with this steering movement. The servo unit 110 in this case may be coupled as a power assistance device 95, 110, 115 either to a steering shaft 75, the steering pinion 45 or the rack 55. The respective power assistance system 95, 110, 115 introduces an assistance torque into the steering shaft 35, the steering pinion 45 and/or into the rack 55, whereby the driver is assisted with the steering operation. The three different power assistance systems 95, 110, 115 shown in FIG. 1 show alternative positions for the arrangement thereof. Generally only one of the positions shown is provided with a power assistance system. In this case the servo unit may be arranged as superimposed steering on the steering column or as a power assistance device on the pinion 45 or the rack 55.

Figure 2:
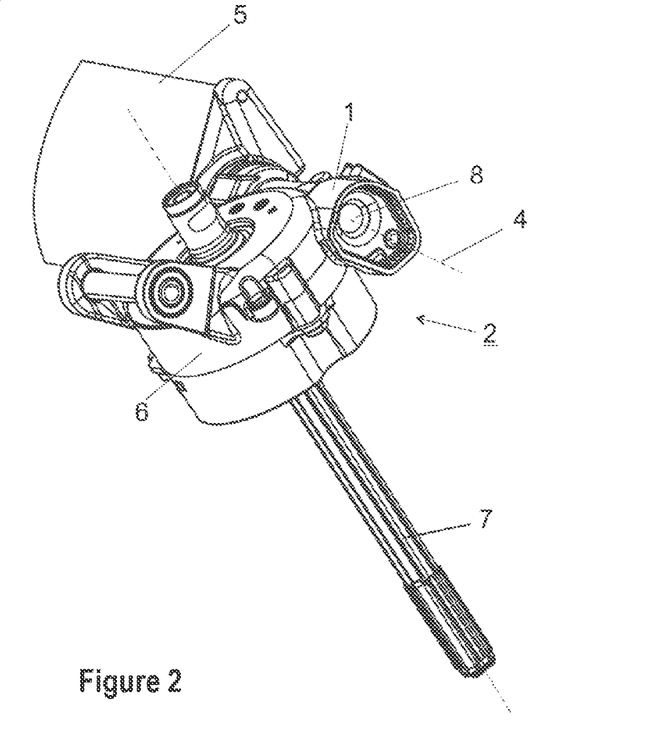
FIG. 2 is a perspective view of a steering gear of an electromechanical motor vehicle steering system.
Figure 3:
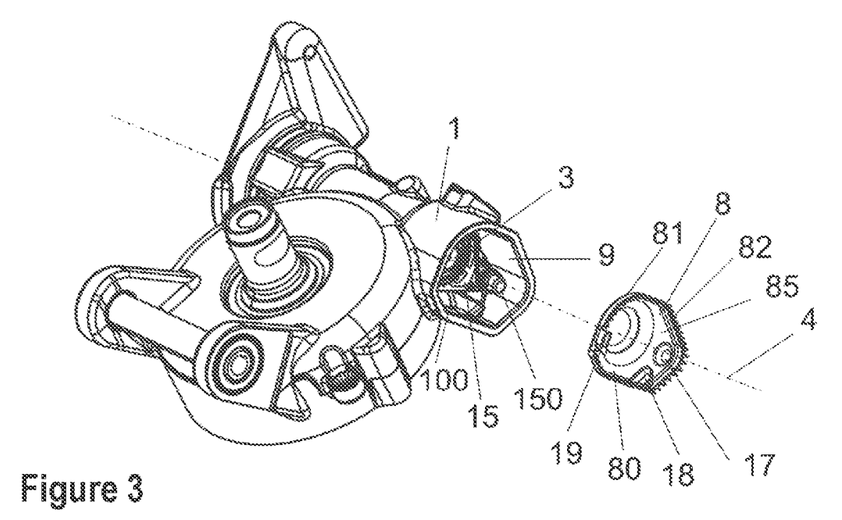
FIG. 3 is an exploded perspective view of a transmission of the power assisted steering system of FIG. 1 mounted in a transmission housing with a view of the worm shaft and a cover closing the transmission housing.
Figure 4:
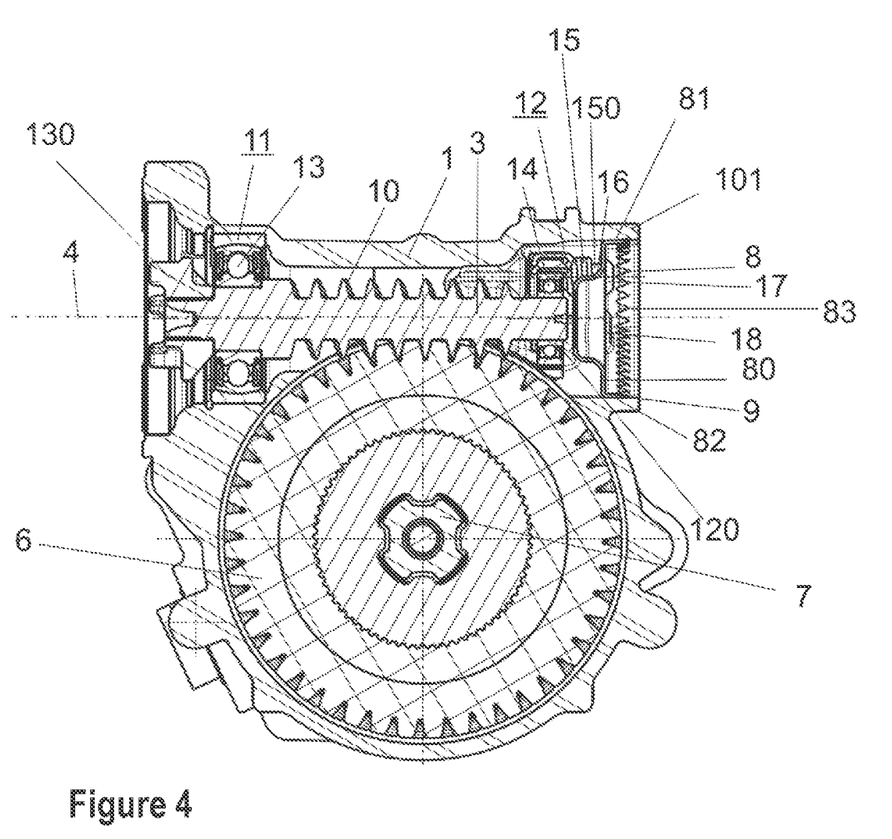
FIG. 4 is a longitudinal section through the transmission of FIG. 1 along the worm shaft.

A transmission housing 1 of a worm gear 2 is shown in FIGS. 2 to 4. A part of the transmission housing 1 is elongated and surrounds a worm shaft 3 which is rotatably mounted about a longitudinal axis 4 in the transmission housing 1. An electric motor 5 or a servo motor drives the worm shaft 3 which with its worm is in engagement with a worm wheel 6, which is connected fixedly in terms of rotation to a steering shaft 7 of a motor vehicle. During operation of the electric motor 5 the worm shaft 3 is driven and the worm shaft 3 and the worm wheel 6 accordingly rotate in order to introduce an assistance torque directly, for example into the steering shaft 7. The transmission housing is closed on the non-drive side by a cover 8.

FIG. 3 shows the transmission housing 1 which at a non-drive-side end of the worm shaft 3 has, in the extension of the longitudinal axis 4 of the worm shaft 3, an opening 9 which is sealed by the cover 8. The cover 8 seals the housing 1 against dirt, spray water and dust. The cover 8 is pressed into the opening 9 by means of a suitable press-in tool for forming an ejection resistance in the direction of the longitudinal axis 4.

FIG. 4 shows the components of the transmission 2 and of the transmission housing 1 in longitudinal section along the longitudinal axis 4. The worm shaft 3 intermeshes via worm teeth 10 with the worm wheel 6. The worm wheel 6 in turn is connected fixedly in terms of rotation to the steering shaft 7 which runs between a steering wheel, not shown, and the actual steering gear of the motor vehicle. The cited structural components are mounted in the common transmission housing 1.

The worm shaft 3 in this case is mounted in the transmission housing 1 by means of the first bearing arrangement 11 which in this example constitutes a drive-side bearing arrangement 11, and the second bearing arrangement 12 which in this example constitutes a non-drive-side bearing arrangement 12. The drive-side bearing arrangement is connected in a torque-transmitting manner via a coupling 130 to the motor, not shown here. The drive-side bearing arrangement 11 has a rolling bearing 13 which is configured as a fixed bearing and permits a pivoting of the worm shaft 3 about a pivot axis. The non-drive-side bearing arrangement 12 has a floating bearing 14 which is configured, in particular, as a deep groove ball bearing. The position of the worm shaft 3 relative to the worm wheel 6 is adjustable by means of a pretensioning device 15 in the region of the non-drive-side bearing arrangement 12. The pretensioning device 15 comprises a spring-pretensioned pin 150 which forms a pivot axis.

The opening 9 of the transmission housing 1 is preferably provided in order to introduce and to mount the non-drive-side bearing 14 and the pretensioning device 15 into the housing 1.

The cover 8 is pressed into a housing portion 101 in the region of the non-drive-side bearing arrangement of the transmission housing 1. The cover 8 comprises a cover base 80, which comprises an inner surface 84 which faces the worm shaft, and an outer surface 85 which is arranged on the side remote from the worm shaft. The cover 8 also has an outwardly protruding peripheral edge 81 arranged substantially perpendicular to the cover base 80. The peripheral edge 81 has a first edge region 82 which extends without interruption along the periphery of the cover base 80 approximately perpendicular thereto. A second edge region 83 adjoining the first edge region 82 on a side remote from the base is shaped in a serrated and/or tooth-shaped manner, wherein the serrated edge 83 formed thereby substantially extends in the direction of the longitudinal axis 4. The serrated edge 83 in this case has in the uninstalled state a greater external diameter than the internal diameter of the opening 9. The edge of the cover 81 tapers in the direction of the base. In the region of the first edge region 82 the external diameter corresponds approximately to the internal diameter of the opening 9 with some clearance so that in the region of the first edge region 82 the cover 8 may be inserted into the opening 9 in a simple manner and without the expenditure of force. The outer second edge region, the serrated edge 83, however, is pretensioned outwardly in the radial direction of the longitudinal axis 2. The outwardly pre-bent serrated edge 83 flexes resiliently in the pressing-in direction. Thus the cover 8 may also be pressed-in in the region of the serrated edge 83 in the mounting direction without great resistance. The serrated edge 83 provides an ejection resistance.

The cover base 80 has an outwardly bulged base surface in the region of the worm shaft 3. The first dome produced by this bulge 16 is substantially cylindrically shaped, with a circular bottom surface. The first dome 16 on its outer face facing the worm shaft 3 constitutes a stop for the worm shaft 3. As shown in FIG. 4 in a normal state of the transmission 1 the end of the worm shaft 3 on the cover side is spaced apart from the outer face of the first dome 16 of the cover 8 in the longitudinal direction. The longitudinal axis of the dome and the worm shaft preferably coincide. The diameter of the first dome 16 in this case is selected such that in this exemplary embodiment it is at least as large as the external diameter of the inner ring 120 of the non-drive-side bearing 12. The first dome 16 in this case also serves as an axial stop for the non-drive-side bearing 12. During operation of the steering, it may arise that the bearing seat of the non-drive-side bearing drops, whereby the bearing may move and the transmission may be damaged. The worm shaft thus requires an axial lock which is greater than or equal to 2 kN which prevents the transmission from being damaged. The cover 8 with the first dome 16 constitutes such an axial lock for the worm shaft and the non-drive-side bearing. No further components are provided between the worm shaft 3 and the cover 8 in the axial direction so that the worm shaft 3 directly strikes against the outer face of the cover 8 and/or the cover base 80 without additional suspension. The serrated edge 83 of the cover is configured such that in the opposing direction to the mounting direction the serrations dig into the softer material of the transmission housing 1 in the housing portion 101 and generate a resistance force which is greater than the force required for the axial lock of the worm shaft. A further advantage of this axial lock is that a striking of the worm shaft and/or of the bearing on the dome generates loud noise which may be perceived by a driver of the motor vehicle as a defect. The driver may then act accordingly and, for example, pay a visit to a workshop.

In the region of the pretensioning device the cover base 80 has an indentation 17 which is oriented inwardly into the cover and faces away from the worm shaft and which provides a corresponding free space for the pivot axis and/or the pin 150 of the pretensioning device 15. The inwardly oriented indentation 17 forms a second dome with a substantially circular cross section. The cover base has a further inwardly oriented indentation 18 which forms a projection away from the worm shaft 3 which serves as mounting stop. In the region of the projection 18 the cover base 80 on its inner face 84, the side in the vicinity of the worm shaft, in the mounted state lies against a rib 100 of the housing 1. The projection 18 thus defines in cooperation with the rib 100 the pressing-in depth of the cover 8 in the opening 9 in the mounting direction. The indentations 17, 18 face away from the worm shaft 3, whilst the dome 16 faces toward the worm shaft and is directly or indirectly in contact with the shaft 3 depending on the respective state.

Figure 5:
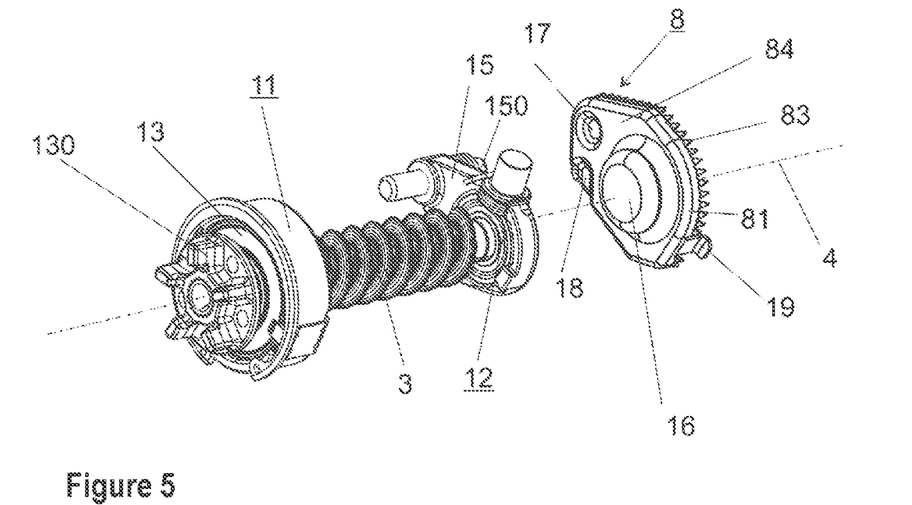
FIG. 5 is an exploded perspective view of the worm shaft and the cover without the transmission housing.
Figure 6:
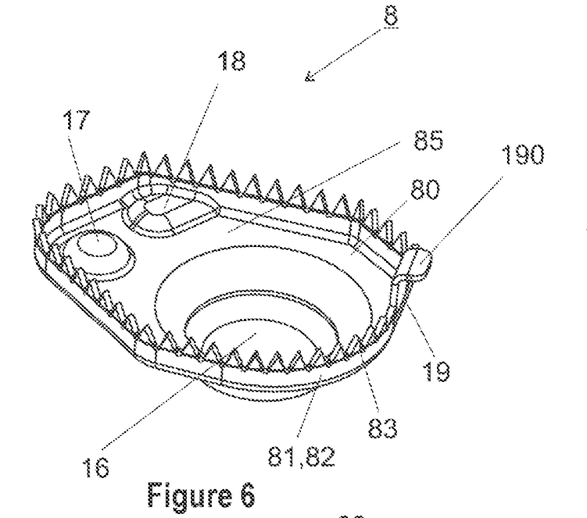
FIG. 6 is a first perspective view of the cover of FIG. 5.
Figure 7:
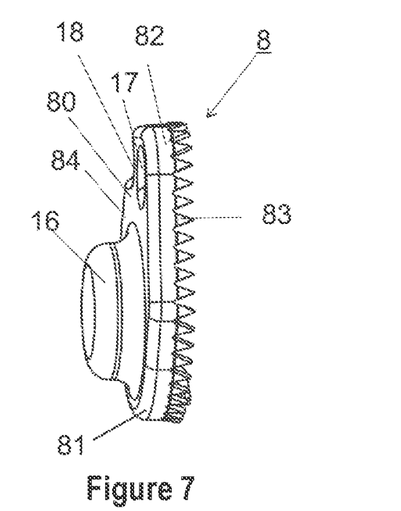
FIG. 7 is a second perspective view of the cover of FIG. 5.

FIGS. 5 to 7 show the details of the cover 8. In the detail the cover base 80 is shown with the axial lock of the worm shaft (bulge) 16 and the indentations 17, 18 for the pin 150 of the pretensioning device 15 of the bearing remote from the motor and for the housing rib 100. The cover 80 additionally has a grip tab 19 which forms part of the cover edge 81 and protrudes over the serrated edge 83 in the direction of the longitudinal axis 4. The grip tab 19 has an outwardly angled-back region 190 which is arranged at a certain distance from the serrations of the serrated edge 83. The tab 19 is preferably configured on a side opposing the projection 18, relative to the first dome 16. The projection 18 and the tab 19 are thus located on a common axis which runs through the center of the first dome 16. The tab 19 serves as a mounting stop. In the installed state of the cover 8 the lower face of the angled-back region 190 of the tab is positioned on the front face of the housing 1 in the region of the opening 9. Since the projection 18 serving as a mounting stop and the tab 19 are located on a common axis, centrally through the first dome 16, the cover 8 may be prevented from tilting during installation. The grip tab 19 also serves as a dismantling aid in order to be able to grip the cover 8 and to pull the cover out of the opening 9.

Figure 8:
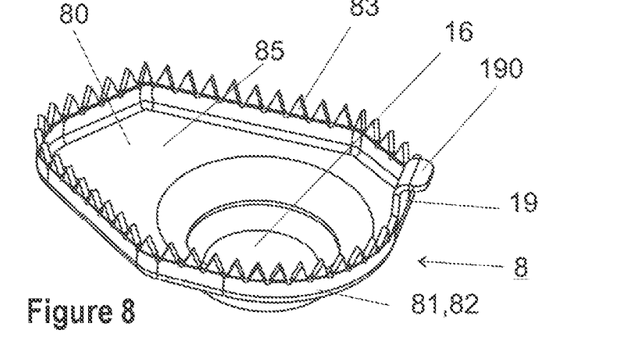
FIG. 8 is a perspective view of a cover according to the disclosure.

In FIG. 8 a second embodiment of a cover 8 is shown. This cover 8 substantially corresponds to the cover 8 described above, wherein the projection and the second dome in the cover base 80 have been omitted.

Figure 9:
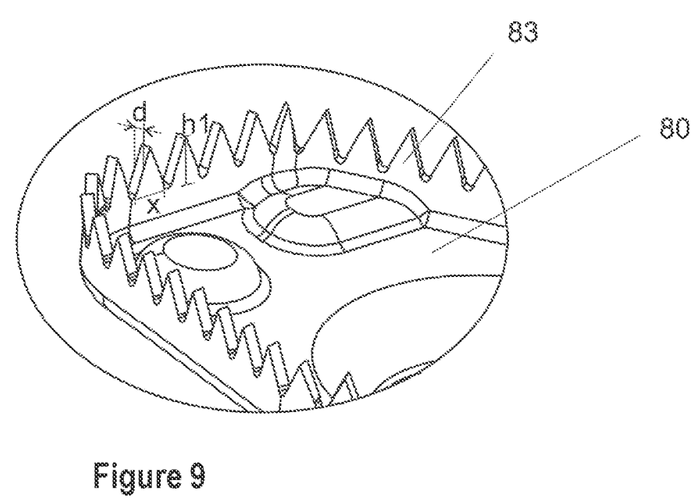
FIG. 9 is a first detailed view of FIG. 5.
Figure 10:
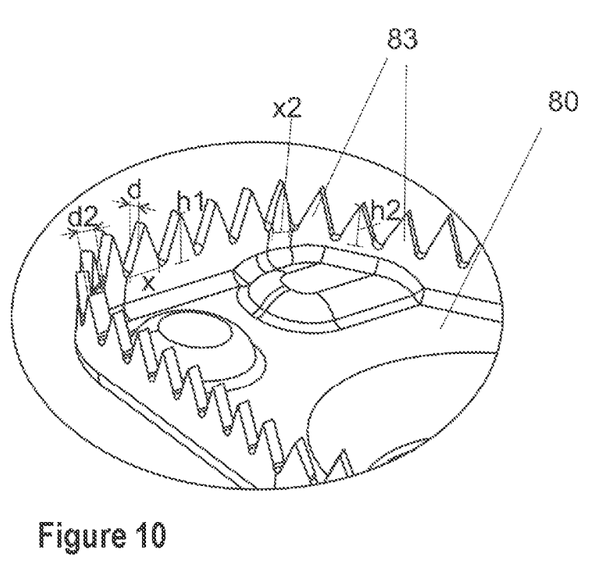
FIG. 10 is a second detailed view of FIG. 5.

In FIGS. 9 and 10 a detailed view of the cover is shown. The serrations 83 in FIG. 9 have a defined serration width d, a defined serration length x and a defined serration height h1. The serration width d and the serration length x may in this case be in a preferred ratio to one another 0<x<3d. The ratio may also be provided in this manner: ⅛<d<x. In FIG. 9 it is shown that the serrations of the serrated edge 83 are configured identically to one another and thus also each serration length x, each serration height h1 and each serration width d over the entire periphery. FIG. 10, however, shows that at least one serration along the periphery of the serrated edge may assume a different length, width and/or height. Thus a serration may have a second serration height h2, differing from the first serration height h1. In this example, the serration height is h2<h1 but h1>h2 may be formed. Moreover, in FIG. 10 it is schematically shown that at least one serration may have a second serration width d2, differing from the first serration width d. In this example d2>d, but d2<d may be formed. The same may be implemented for at least one serration length x. The second serration length x2 in this case is less than x, but x>x2 may be formed.

In all of the embodiments, the cover preferably has a lower strength than the transmission housing. The transmission housing is preferably a cast housing made of aluminum. The cover is preferably made of sheet metal, in particular spring steel. The cover may be produced, in particular, from a material which is suitable for metal laser sintering or from tool steel.

What is claimed is:

1. A helical-gear transmission for an electromechanical power steering, comprising:
    a transmission housing;
    a helical gear;
    a shaft having a first end and a second end, the shaft rotatably mounted in the transmission housing about a longitudinal axis and intermeshed with the helical gear;
    wherein the first end is arranged in a first bearing arrangement and the second end is arranged in a second bearing arrangement,
    wherein the transmission housing has, in extension of the shaft on a non-drive-side end, an opening which is configured to seal by a cover, wherein the cover has a cover base and a surrounding cover edge, and
    wherein the cover base has, in a region of the shaft, a bulge extending to an outside in a direction of the shaft which forms an axial lock of the shaft, and wherein the surrounding cover edge has a tab which has an outwardly angled-back region, wherein in an installed state of the cover a lower face of the angled-back region lies against a front face of the housing forming the opening.

2. The helical-gear transmission of claim 1 wherein the cover is pressed into the opening.

3. The helical-gear transmission of claim 1 wherein the bulge is shaped cylindrically with a circular bottom surface.

4. The helical-gear transmission of claim 3 the bulge has an external diameter which is at least as large as a diameter of the shaft.

5. The helical-gear transmission of claim 3 wherein an axis of symmetry of the bulge corresponds to a longitudinal axis of the shaft.

6. The helical-gear transmission of claim 1 wherein the cover edge has a serrated edge which is pretensioned outwardly in a radial direction of the longitudinal axis of the housing and in the pressed-in state lies against an inner face of the transmission housing and forms an ejection resistance.

7. The helical-gear transmission of claim 6 wherein the serrated edge is fixed by pretensioning.

8. The helical-gear transmission of claim 7 wherein the serrated edge produces a non-positive connection of the cover with the transmission housing.

9. The helical-gear transmission of claim 1 wherein the cover base has an inwardly oriented projection which in an installed state lies on an outer face against the transmission housing and forms a mounting stop, wherein the tab and the projection are arranged on opposing sides of the bulge.

10. The helical-gear transmission of claim 1 wherein the helical gear is a worm wheel and the shaft is a worm shaft.

11. An electromechanical power steering comprising an electric motor having the helical-gear transmission of claim 1, wherein a motor shaft drives the shaft of the helical-gear transmission.

12. The electromechanical power steering of claim 11 wherein the helical gear is arranged fixedly in terms of rotation on a steering shaft of a motor vehicle.

13. A helical-gear transmission for an electromechanical power steering, comprising:
    a transmission housing;
    a helical gear;
    a shaft having a first end and a second end, the shaft rotatably mounted in the transmission housing about a longitudinal axis and intermeshed with the helical gear;
    wherein the first end is arranged in a first bearing arrangement and the second end is arranged in a second bearing arrangement,
    wherein the transmission housing has, in extension of the shaft on a non-drive-side end, an opening which is configured to seal by a cover, wherein the cover has a cover base and a surrounding cover edge, and wherein the cover base has, in a region of the shaft, a bulge extending to an outside in a direction of the shaft which forms an axial lock of the shaft, wherein the second bearing arrangement has a pretensioning device, a position of the shaft being adjustable thereby relative to the helical gear, wherein the pretensioning device has a spring-pretensioned pin which defines a pivot axis and wherein the cover base has an inwardly oriented indentation which forms a free space for the pin.

14. A helical-gear transmission for an electromechanical power steering, comprising:
    a transmission housing;
    a helical gear;
    a shaft having a first end and a second end, the shaft rotatably mounted in the transmission housing about a longitudinal axis and intermeshed with the helical gear;

wherein the first end is arranged in a first bearing arrangement and the second end is arranged in a second bearing arrangement, wherein the transmission housing has, in extension of the shaft on a non-drive-side end, an opening which is configured to seal by a cover, wherein the cover has a cover base and a surrounding cover edge, and wherein the cover base has, in a region of the shaft, a bulge extending to an outside in a direction of the shaft which forms an axial lock of the shaft, wherein the cover base has an inwardly oriented projection which in an installed state lies on an outer face against the transmission housing and forms a mounting stop, or the cover edge has a first edge region which extends without interruption along a periphery of the cover base and a second edge region which adjoins the first edge region on a side remote from the cover base, wherein the second edge region forms a serrated edge, or wherein the transmission housing is formed from a softer material than the cover, or wherein the transmission housing is formed as a cast housing made of aluminum and the cover is produced from a spring steel.

* * * * *

UNITED STATES PATENT AND TRADEMARK OFFICE
CERTIFICATE OF CORRECTION

| | | |
|---|---|---|
| PATENT NO. | : 12,031,624 B2 | Page 1 of 1 |
| APPLICATION NO. | : 15/733993 | |
| DATED | : July 9, 2024 | |
| INVENTOR(S) | : Andreas Bachmann | |

It is certified that error appears in the above-identified patent and that said Letters Patent is hereby corrected as shown below:

On the Title Page

In item (73) "Assignees", should appear as:
(73) Assignees: thyssenkrupp Presta AG, Eschen (LI); thyssenkrupp AG, Essen (DE)

Signed and Sealed this
Fourth Day of February, 2025

Coke Morgan Stewart
*Acting Director of the United States Patent and Trademark Office*